United States Patent [19]

Eickmann

[11] Patent Number: 4,864,979

[45] Date of Patent: Sep. 12, 1989

[54] COMBUSTION ENGINE

[76] Inventor: Karl Eickmann, 2420 Isshiki, Hayama-machi, Kanagawa-ken, Japan

[21] Appl. No.: 196,649

[22] Filed: May 20, 1988

Related U.S. Application Data

[63] Continuation-in-part of Ser. No. 787,829, Oct. 15, 1985, which is a continuation-in-part of Ser. No. 364,574, Apr. 1, 1982, Pat. No. 4,546,743, which is a continuation-in-part of Ser. No. 807,975, Jun. 20, 1977, abandoned.

[30] Foreign Application Priority Data

May 25, 1987 [DE] Fed. Rep. of Germany ....... 3717578

[51] Int. Cl.$^4$ .............................................. F02B 75/02
[52] U.S. Cl. ............................ 123/65 BA; 123/65 VB
[58] Field of Search ........... 123/73 PP, 65 A, 65 BA, 123/65 VB, 73 AF, 73 CA, 74 B, 73 V, 432, 65 R

[56] References Cited

U.S. PATENT DOCUMENTS

| | | | |
|---|---|---|---|
| 970,153 | 9/1910 | Winand | 123/75 B |
| 2,280,839 | 1/1938 | Nallinger | 123/65 BA |
| 3,859,968 | 1/1975 | Stinebaugh | 123/73 V |
| 4,176,631 | 12/1979 | Kanao | 123/73 PP |
| 4,463,566 | 8/1984 | Guidoboni et al. | 123/65 BA |

FOREIGN PATENT DOCUMENTS

| | | | |
|---|---|---|---|
| 3022901 | 12/1981 | Fed. Rep. of Germany | 123/73 V |
| 2082676 | 3/1982 | United Kingdom | 123/73 R |

Primary Examiner—David A. Okonsky

[57] ABSTRACT

The combustion engine of this invention is basically a two stroke engine at which each revolution of the crankshaft is subjected to a power stroke in each of the cylinders. However, this engine is chargable with turbo- or loader-pressure to increase its power considerably. For this purpose the engine has exhaust slots with an exhaust collection chamber on one end of the cylinders and the head cover on the other end of the respective cylinder. Each head cover is provided with at least one independent first inlet valve and a second independent inlet valve, while the passages to the inlet valves are completely separated from each other. Through the first inlet valve a flashing flow is passed to clean the cylinder from exhaust gases, while after closing of the first inlet valve, the second inlet valve is opened to pass a pre-compressed or loaded flow into the cylinder at a time when the exhaust slots are already closed. By obeying the details and the combination of the invention, any losses of charging flow or of fuel particles are reduced or prevented and the engine obtains an extremely high power output per unit of weight in combination with a performance almost equal to that of four-cycle engines.

3 Claims, 4 Drawing Sheets

COMBUSTION ENGINE

REFERENCE TO RELATED APPLICATIONS

This is a continuation in part application of co-pending application Ser. No. 06-787,829, filed on Oct. 15, 1985, which is a continuation in part application of Ser. No. 06-364,574, filed on Apr. 1 1982, now U.S. Pat. No. 4,546,743 and which was filed as a continuation in part application of Ser. No. 05-807,975, filed on June 20, 1977, now abandoned. Benefits of the above mentioned applications are claimed for this present application and international priority of (West) German Patent application No. P 37 17 578.5 of May 25, 1987 is also claimed for this present application.

FIELD OF THE INVENTION

This invention relates to combustion engines with in a cylinder reciprocating piston with one power stroke per revolution and per cylinder. The invention applies means to increase the power and efficiency of such engines in compact space and at little weight per horse power. Thereby the engine of the invention is specifically suitable for vertical take off aircraft and other vehicles.

DISCUSSION OF THE PRIOR ART

An effective and reliable engine of this system is provided by my U.S. Pat. No. 4,546,743. This engine of my prior art has two valves in the cylinder head for the inlet of air or fuel-air mixture and it has slots in the bottom portion of the cylinder for the exhaust of the burned gases. It also has a turbo charger. The cylinder is filled with air or air and fuel mixture through the inlet valves of the cylinder head on top of the cylinder after the burned and expanded gases have left the cylinder through the outlet slots in the bottom portion of the cylinder when the piston is moved so far in the downwards stroke that the piston temporarily opens the mentioned outlet slots. During the upwards stroke the piston closes the outlet slots and thereafter compresses the air or air-fuel mixture. Thereafter the piston reaches its upper position, the fluid is compressed and the charge becames now ignited whereby the burning and expansion of the gases starts, continues and drives the piston for a working stroke or power stroke from its upper position to its lower position, until the piston opens the mentioned outlet slots and the used gases axhaust through the outlet slots. When that is completed, the entire cycle repeats at the next revolution of the crank shaft.

SUMMARY OF THE INVENTION

The aim of the invention is to materialize a powerful and reliable engine with lowest weight and most compact size per unit of power in order that this engine may be used to drive vehicles and, specifically, to supply a satisfactory performance and power for vertical take off and landing aircraft, which after take off fly horizontally on wings.

One object of the invention therefore is to let the engine economically operate at forward flight on wings at less than one half or one third of its maximum of power, while the engine will be capable of an extremity of high power for the short time of vertical take off and landing, when used in an aircraft.

The second object of the invention is to improve the engine of my U.S. Pat. No. 4,546,743 to a still considerably higher power and better performance at even a lower weight per unit of power.

Another object of the invention is to prevent exhaust of fuel particles.

A still further object of the invention is to prevent dead spaces and fluid mixing spaces in the neighborhood of the inlet valves.

Still another object of the invention is to let at least two inlet valves in the cylinder head open at different times in succession for one of this valves letting a cleaning and flashing air into the cylinder at times when the exhuast ports are still open, while the other of the mentioned valves opens when the exhauts slots close and then passes pre copressed air or air-fuel mixture from a loader or turbo charger into the cylinder.

Another object of the invention is to use the change of volume of the crank shaft housing to pre compress preferably air to lead it to there mentioned first valve in the cylinder head.

In this respect is is also an important object of the invention to provide a suitable short passage of large enough cross sectional are from the crank shaft housing to the mentioned first inlet valve, while it is important in this respect that a one way check valve becomes applied in this passage in the immediate neighborhood of the crank shaft housing to secure that practically no fluid can return from a space or passage to the crank shaft housing.

One further important object of the invention is, to provide the above and/or other objects in combination, in order to obtain the desired maximum of power and reliablity of the engine.

BRIEF DESCRIPTION OF THE DRAWINGS

FIGS. 4 and 5 are sectional views through FIG. 2 along the arrowed lines II—II and III—III of FIG. 2, respectively, and;

DESCRIPTION OF THE PREFERRED EMBODIMENTS

Figure 1:
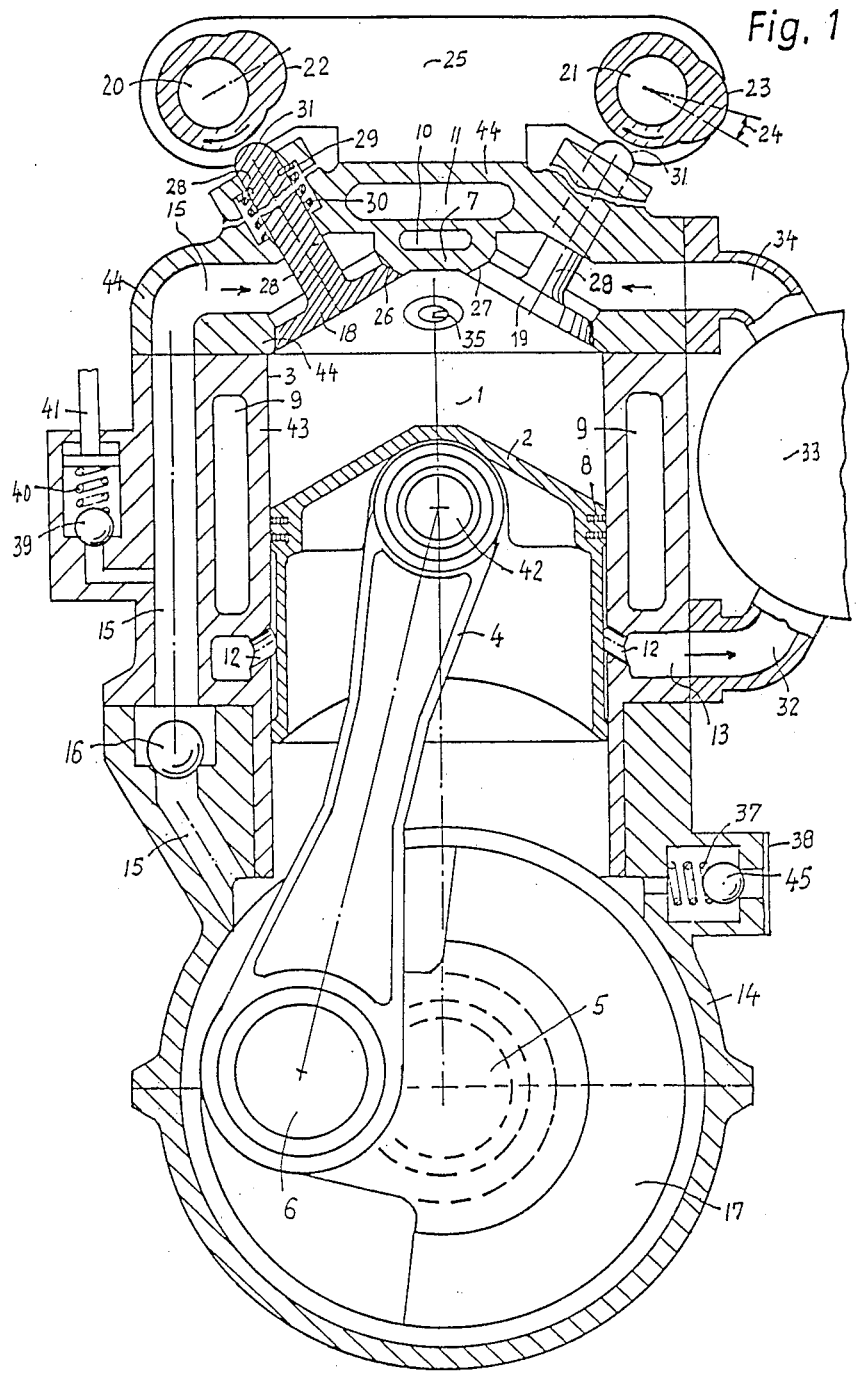
FIGS. 1 to 3 are longitudinal sectional views through embodiments of the invention.

In FIG. 1 the piston 2 reciprocates in working chamber 1 which is formed by the cylinder 43 and head cover 44. The piston is connected by the connecting rod 4 by means of bearings or pins 42 to the eccentric bearing 6 of crank shaft 5 which is borne in crank shaft housing 14. The ingnition or fuel injection means are indicated by 35. The cylinder is provided with a cooling space 9 or with cooling ribs 214 of FIG. 2. The valves have seats 26,27 df valve heads 18,19 and valve stems 28 for guidance of their reciproction in head cover 44. Head cover 44 may have cooling spaces 10,11 or cooling ribs 214 of FIG. 2. The piston rings 8 seal along the inner face 3 of the cylinder. So far the arrangement is generally known in the prior art.

Figure 2:
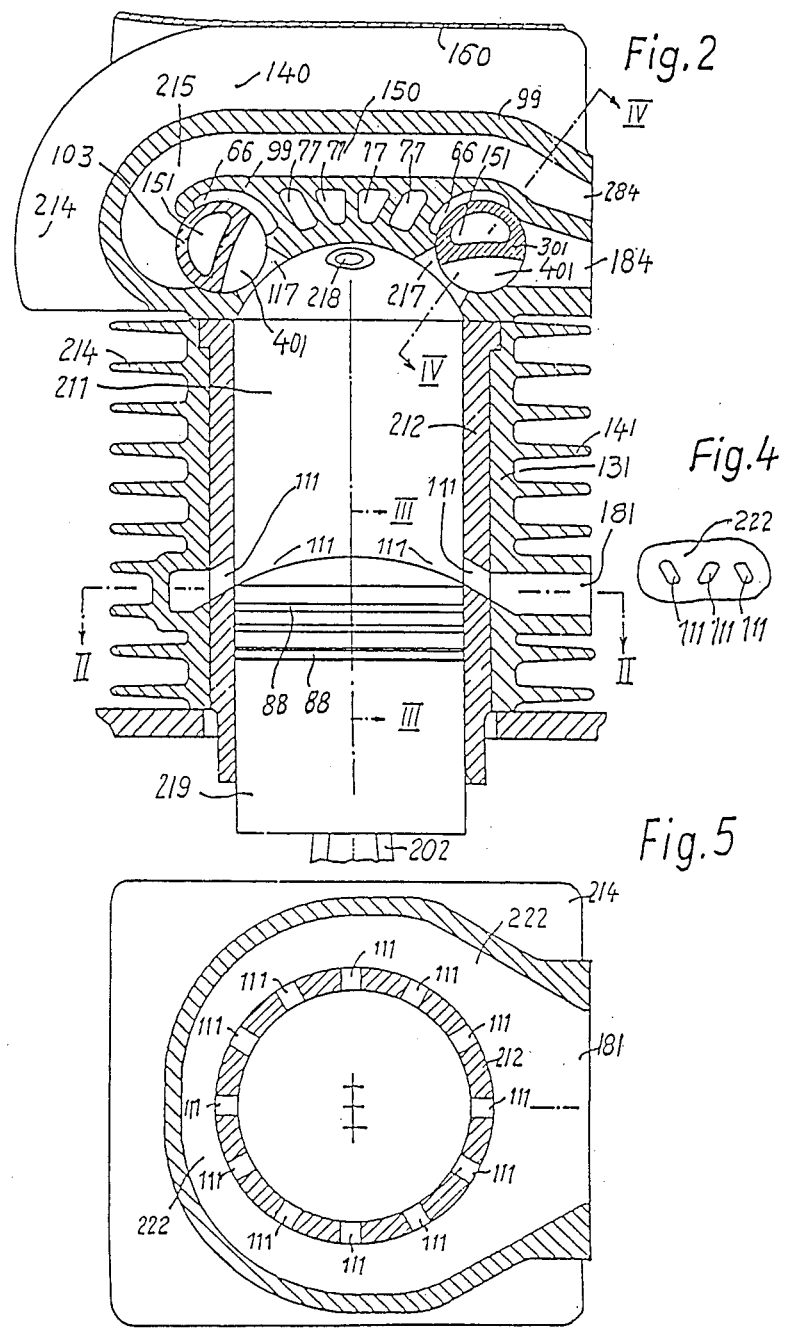

Known in the prior art is from my mentioned U.S. Pat. No. 4,546,743 also that two or more valves may be used as inlet valves in the head cover and that exhaust slots 12 are provided in the lower portion of the cylinder which are opened and closed by piston 2 when the piston runs over them. The exhaust slots 12 are shown by 111 in FIG. 2 and FIG. 5 illustrates how these exhaust slots port into a common exhaust collection chamber 222 which leads to the exhaust outlet 181. FIG. 4 illustrates that the exhaust slots may be longitudinally inclined in different direction. The valves of FIG. 1 may be actuated by cam shafts with cams 22,23 respectively. Passage 32 connects the exhaust port 13,181 to the turbine of the turbo charger 33 and passage 34 leads from the loader of the turbo to the respective inlet valves. The inlet valves are pivoting or revolving in FIG. 2.

Figure 3:
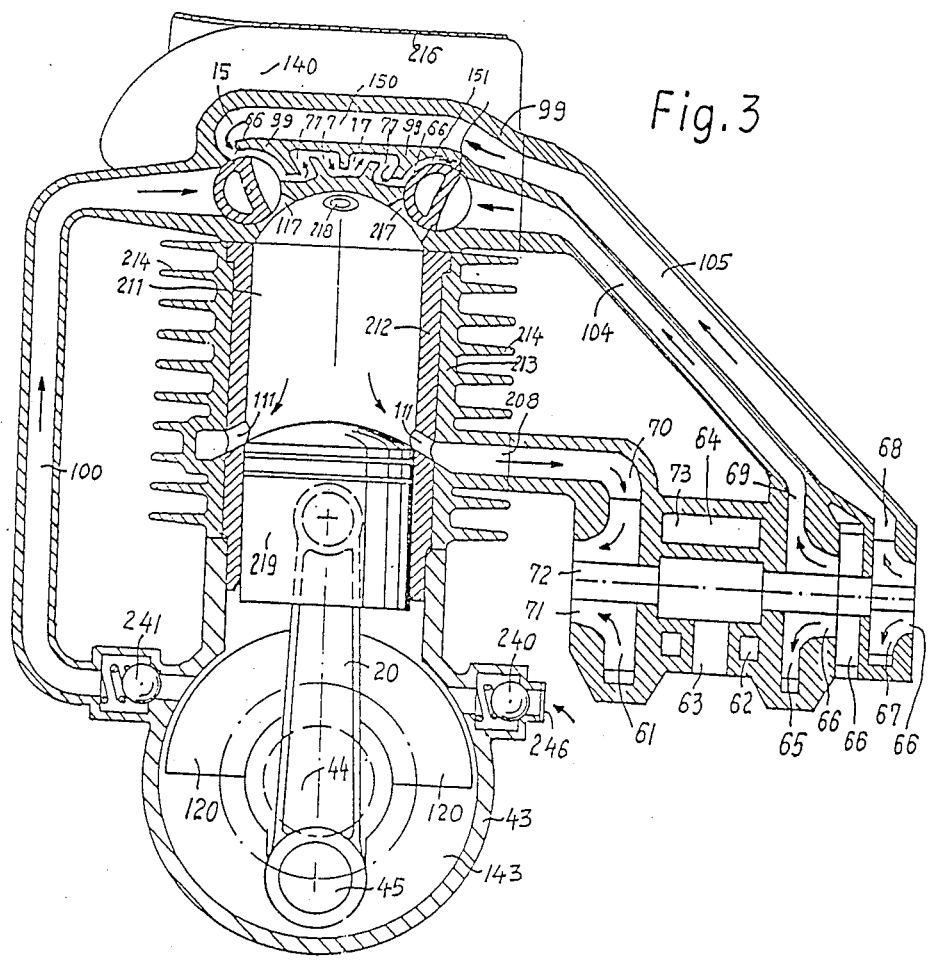

In FIGS. 2 and 3 the cylinder is cited by 212, the piston by 219 and the head cover by 99.

The invention provides a combination of a plurality of arrangements. This is illustrated in the Figures. In the crank shaft housing an interior space 17,143 is formed and provided with an inlet valve 45 (240 in FIG. 3) and an outlet valve 16 (241 in FIG. 3). These valves may be loaded by springs, f.e. 37. The outlet valve of the crank case chamber 17,143 is in accordance with the invention located in the immediate neighborhood of the crank case chamber to prevent excessive dead space in the crank case chamber. The purpose of these valves 16,241 is also to prevent communication of the crank case chamber with the transfer passage 15,100 of the invention. The transfer passage 15,100 has the purpose to transfer compressed fluid, for example, air, from the crank case chamber to the first inlet valve of the head cover.

The transfer passage may be provided with a regulator or safety valve 39, if so desired. The spring 40 may load such valve and the pin or piston 41 is its adjuster.

One important arrangement of the invention is also that the head cover is provided with at least two inlet valves 18,19 (FIG. 1) 103,301 (in FIG. 2) which are actuated timely spaced by operating the first inlet valve first and the second inlet valve thereafter in combination with the arrangement of the opening and closing means of these valves in the immediate neighborhood of the working chamber 1,211 and with the further arrangement that separation walls 7 or body portions 7 are provided between the first and second inlet valves for the prevention of communication between the flows of fluid through the first and second inlet valves. Thereby it becomes secured that the flows of fluid through the first and second inlet valves can never communicate or mix and it is also secured that no losses in ecessive dead space volumes appear.

The operation of the engine of the invention is, in principle, as follows:

An air filter 38 may be mounted before the crank case chamber inlet valve. During the upwards stroke of the piston the volume of the crank case chamber increases. It is important here that the outlet valve 16 is provided in the immediate neighborhood of the crank case chamber to prevent entering of air from passage 15,100 into the crank case chamber. Under these circumstances the increase of volume of the crank case chamber leads to an under pressure (respective to the atmospheric pressure outside of the crank case) and opens the crank case inlet valve whereby air is now drawn into the crank case chamber. As soon as the piston starts its downwards stroke, the crank case inlet valve closes and the air in the crank case chamber compresses because the downward stroke of the piston now reduces the volume of the crank case chamber. Thereby the now appearing pressure in the crank case chamber now opens the crank case outlet valve and passes the compressed air into the transfer passage 15,100. At the end of the downward stroke of the piston the crank case outlet valve closes and keeps the compressed air in the transfer passage 15,100, while it prevents back flow of air or fluid from passage 15,100 into the crank case chamber.

During the expansion stroke of the piston, which is the downward stroke of the piston, the top of the piston runs over the exhaust slots 12,111 and opens them. Since the gas has in the cylinder still several atmospheres of pressure, when the piston opens the exhaust slots, the gases exhaust through the exhaust slots over passage(s) 13,32,181,208,70 into the turbine 61 of turbo charger 33,73 to drive and revolve the turbine and loader(s) 65,67 of turbo loader 33.

After the sudden exhaust, according to the invention, the first inlet valve 18,103 is opened in order to pass air from the transfer passage 15,100 through the first inlet valve into and through the working chamber. According to the invention, this flow is a flow of pure air without fuel mixture and this flow of fluid is a flashing flow which cleans the working chamber from remainders of used old gases. According to FIG. 3, this flashing flow or cleaning flow may become assisted by an air flow 105 from a second turbo loader 67 and these flows may also serve for cooling purposes by leading it (them) along respective to be cooled portions of the engine. See hereto cooling spaces 150,77 and cooling ribs 99 of FIG. 3. The working chamber is on the end of this flashing action fully cleaned from old used gases and filled with fresh air. When thereafter the piston moves upwards and closes the exhaust slots 12,111, the first inlet valve 18,103 closes and the second inlet valve 19,301 opens. Thereby compressed fluid, like air or air-fuel mixture, passes from the loader 65 of turbo or other loader 65 towards (in FIG. 3 by fluid line 104) and through the now opened second inlet valve 19,301. Thereby this second flow passes into the working chamber 1,211 and fills it with a relative highly pre compressed fluid, air or air-fuel mixture. Thereby the working chamber is now pre-loaded with a pressure in the neighborhood of 0.5 to 2.5 atmospheres loader pressure. The effect thereof is, as known from turbo charger engines, that the engine then obtains very much increased power because of the operation under higher pressure. During the upwards stroke of the piston this fluid becomes now further compressed towards the ignition pressure. If the second flow was air-fuel mixture from a carburator associated to the loader, the charge becomes ignited by ignition means 35. But is the second flow was loader-compressed air, the fuel is now injected through injection means 35. Thereby the burning of the charge starts about at the upper location of the piston and the ignited charge obtains its higher combustion pressure with which it actuates the expansion- or power- stroke, namely the downward stroke of the piston which thereby transfers the obtained power over the connecting rod to the crank shaft.

By the clear separation of the cleaning flow from the loading flow, losses of compressed loader charged air is prevented according to the invention, outflow of fuel particles out of the working chamber is prevented and the engine of the invention obtains a performance almost equal to four cycle engines, while it obtains the power of the turbo chagred two cycle engine. Note that common motorbike two cycle engines cannot use turbo charging effectively because the compressed loader air would just pass through the passages of the common motor bike engine without filling the working chamber with compressed fluid. All work of the turbo charger would be lost and if the loader had the carburator associated with the loader, then the fuel would also be lost.

This is the reason, why common two cycle engines, as widely used in motor bikes and the like, can not easily become turbo charged as four cycle engines can be charged.

By the present invention the power of two cycle engines can be roughly doubled and if the invention is applied to double piston engines, the power can roughly become tripled or fourfold. For example, a race bike engine of 250 CC gives presently about 45 horsepower. The engine of the invention would give about 90 horsepower at not much more weight and if the invention is applied to a double piston engine, the engine of equal piston sizes and strokes would have 500 CC and would bring 150 to 180 horsepower. In short, the engine of the invention promises to bring the same power at the same weight as the accessory gas turbines of the Tornado fighter plane give. The aim of the invention, to provide an engine suitable for vertical take off and landing aircraft for citizen with average budgets is obtained by the present invention. Existing motor bike engines can be modified by the present invention, by setting the cylinders and valve heads of the invention as well as the crank case valves and transfer passage of the invention to existing crank shafts, conrods anmd pistons of common engines of the market.

To obtain this aim of the invention, the details of the inventioon must become obeyed, especially the total separation of the flashing flow from the loading flow, the prevention of back flow from passages (f.e. 14, 100) into the crank case housing, the location of the valves of the valve head in the immediate neighborhood of the working chamber, and the like.

In FIG. 1 the angle 24 indicates that the cam 23 of the second inlet valve opens later by angle 24 than the cam 22 of the first inlet valve. Similarly, the second valve of FIGS. 2 and 3 is shown in a following position relative to the first inlet valves of these Figures. Instead of providing only one first and one second inlet valve, a plurality of first and second inlet valves may be provided. The valves of FIGS. 2 and 3 may be rotating valves or pivotig valves. The valves are commonly driven by a transmission means from the crankshaft whereby the inlet valves of the head cover open and close in dependency on the rotary angle "alpha" of the crank shaft.

The cam shafts 20,21 in FIG. 1 may be hollow pipes to reduce weight and a passage portion 15 below valve 16 may serve to permit the setting of a valve 16 for closing under its own weight of the valve by gravity. It should be understood, however, that it is more effective in accordance with this invention, if one way check valve 16 is set still more close to the interior space of the crank shaft housing by prevention of passage portion 15 below valve 16. But then the valve may have to become spring loaded for closing, because above the crank shaft case is the cylinder and there may be no space for an exactly vertically set valve 16 in the crank shaft housing. Due to the increased power, thereby heat, effective cooling means like liquid cooling chambers 9,10, 11 or air cooling ribs 140,214 should be provided to the cylinder and to the head cover. The valve heads 18,19 in closing seats 26,27 have flat head faces under an angle parallel to the top face portions of piston 2 in order to make high compression ratios for fuel injection engines possible. The mentioned head faces of the valves directly border the working chamber to reduce dead space volume or to prevent it entirely and the cylindrical pivotal or rotary valves of FIGS. 2 and 3 have only very short passages 117,217 towards the working chamber, again for the prevention of dead space and for obtainment of high compression ratios for fuel injection type engines. The valves of FIGS. 2 and 3 may have interior cooling spaces 151 for leading a cooling flow through them and they have the passages 401 for the opening of the valves to the working chambers by communicating these passages to the working chamber 1,211 for inlet of the first and second flows and for closing the inlet valves by discommunicating the passages 402 from the working chamber by pivoting or revolving the valves around their longitudinal axes.

FIG. 3 serves only to give an overall view of all members including the turbo charger, but it also serves to show that the turbo may supply a plurality of flows, whereof one may be a first flow in the gist of the invention, namely the flashing flow, another flow may be the second flow, namely the loading flow and a further flow may be a cooling fluid flow.

Transfer passage 15,100 may also be formed with considerable volume (not shown in the Figures) by widening it for using the transfer passage as an accumulator for compressed air wherein the pre compressed air from the crank shaft housing will then be stored after the one way check valve is closed and until the flashing flow inlet valve becomes opened. The counter-weights of the crank shaft are shown by 17 and 120 in the Figures.

Figure 6:
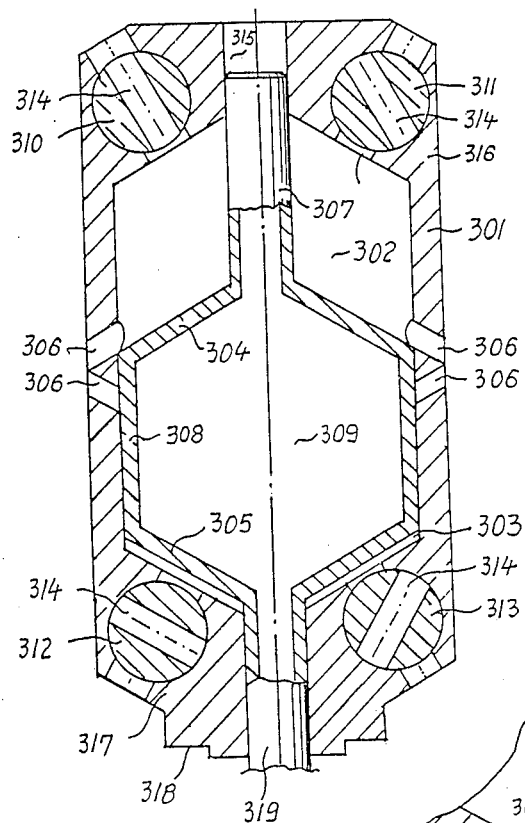
FIGS. 6 and 7 are longitudinal sectional views through principles of embodiments of the invention.
Figure 7:
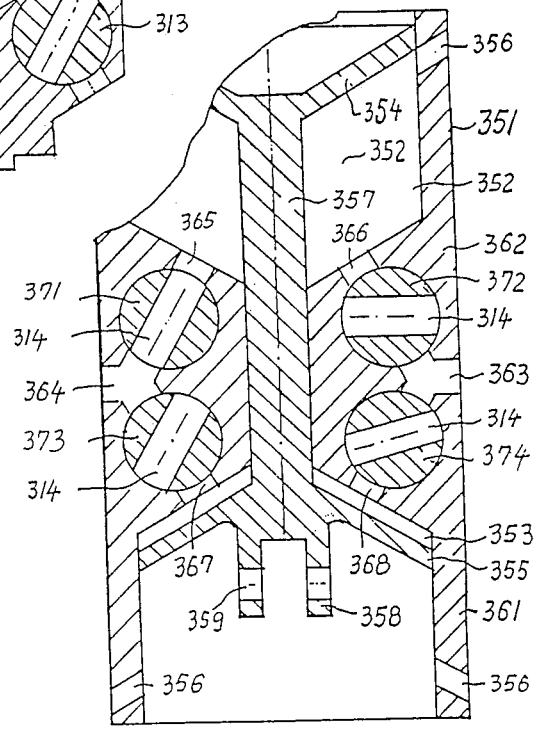

In FIGS. 6 and 7 the independently operating first and second inlet valves are in accordance with the invention applied in cylinder covers of double piston engines. The difference in FIGS. 6 and 7 is mainly only that in FIG. 6 the inlets are located on the axial outer ends of the respective cylinders, while in FIG. 7 they are located on the axial inner ends of the respective cylinders. The exhaust slots are on the opposite ends of the respective cylinders as in all Figures of this patent application. The communications to the first and second inlet valves are in principle as in the earlier Figures and they are therefore not repeated in FIGS. 6 and 7.

In FIGS. 6 and 7 the cylinders 301,351,361 establish in each engine a first and second working chamber 302,303 or 452 and 353. These working chambers periodically vary their volumes by the reciprocating pistons. Each engine of these Figures has two pistons 304,305 or 354,355 which are connected together by a medial shaft or medial portion 308,357, In FIG. 6 the pistons may have piston shafts 307,319 endwards of the pistons, for example, for connection of a loader means or for connection by bearings 358,359 to the connecting rod of the crankshaft. The cylinders may have seats 318 for connection to the crank shaft housing of the earlier Figures. In FIG. 6 the piston is hollow by the provision of an interior space 309 for reduction of the weight of the reciprocating mass of the double piston. FIG. 6 forms the cylinder head covers 316,317 on the axial ends of the cylinders, while FIG. 7 forms them by portion 362 in the medial portion between the cylinders. The first and second inlet valves are located in the mentioned cylinder head cover portions and they have the passages 314 for opening and closing the vales to the respective working chambers in the cylinders. Thus, FIG. 6 shows first inlet valves 310 and 312 for the flashing flow and second inlet valves 311,312 for the loading or turbo charging flow. FIG. 7 shows first inlet valves 371,373 for the first or flashing flow, while it has the second inlet valves 372 and 374 for the second, loading- or turbo charging-flows. In FIG. 7 the first valves may have a common entrance passage 364 from passage 15,100 and a common second entrance passage 363 from the loader or turbo charger. In FIG. 7 these entrance passages branch after the inlet valves into the passages 365,367,366 and 368 to the respective working chambers. As far as other means of FIGS. 6 and 7 are not described, they are similar to one or more of the earlier Figures and understood from a study of the earlier FIGS. 1 to 5.

Since the invention is more in detail described in the claims and their combinations, the claims are considered to be also a portion of the description of the preferred embodiments of the invention.

What is claimed is:

1. A combustion engine, comprising, in combination, a piston reciprocable in a cylinder which forms between said cylinder, said piston and a head cover on the upper end of said cylinder a working chamber which periodically at the reciprocating strokes of said piston decreases and increases its volume, while said head cover has closeable inlet means and said cylinder has outlet slots on its lower portion with said outlet slots opened and closed by said piston during the lowest portions of said piston strokes for passing fluid through said head cover into said cylinder, through said cylinder and out of said cylinder through said outlet slots during times of lower portions of said piston strokes, while said fluid is subjected to compression, combustion and expansion during the main- and upper- portions of said piston strokes with said piston connected by a connecting rod to a crank shaft which is located in a crank shaft housing which has inlet and outlet means for passing air for compression through said housing, while said outlet slots of said cylinder are communicated to an inlet of a loader with the outlet of said loader communicated to a portion of said inlet means of said head cover, wherein a passage is provided from said outlet of said crank shaft housing to a first portion of said inlet means of said head cover, wherein a one way check valve is provided in said passage in the immediate neighborhood of said crank shaft housing, wherein said inlet means of said head cover includes two independenty operable inlet valves with said passage leading to the first inlet valve of said head cover while the communication from said outlet of said loader leads to the second inlet valve of said head cover, wherein said independently operable valves have closing seats immediate to the upper end of said working chamber, wherein actuator means are provided to said independently operable valves with said actuator means acting in dependance on the rotary angle of said crank shaft, and, wherein said first independently operable valve is subjected to opening at a portion of the time at which said piston opens said outlet slots for passing air from said crank shaft housing through said working chamber, while said second independently operable valve is subjected to opening and closing at a lower portion of said piston stroke after closing of said outlet slots by said piston for passing pre compressed fluid from said loader into said working chamber, whereby said engine provides a powerful power stroke in said cylinder at every single revolution of said crank shaft.

2. The engine of claim 1, wherein said independenty operable valves are reciprocable valves with a valve stem for the guidance for the reciprocating movement of the respective valve and with a valve head for closing in a respective valve seat in said head cover, and, wherein closing walls are provided between the spaces around portions of said valves for separation of the flows to and through said first and second independently operable valves.

3. The engine of claim 1, wherein said first and second independently operable valves are substantially cylindrical bodies with movements around their longitudinal axes in respective valve beds with said bodies having passages for opening and closing said valves towards said working chamber, respectively, and, wherein closing wall portions are provided between spaces around portions of said valves for separation of the flows to and through said first and second independently operable valves.

* * * * *